United States Patent
Laurell et al.

(10) Patent No.: US 9,376,951 B2
(45) Date of Patent: Jun. 28, 2016

(54) EXHAUST GAS AFTERTREATMENT DEVICE

(71) Applicant: VOLVO CAR CORPORATION, Gothenburg (SE)

(72) Inventors: Mats Laurell, Gothenburg (SE); Jan Dahlgren, Torslanda (SE); Marie Stenfeldt, Gothenburg (SE); Peter Sandberg, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/535,906

(22) Filed: Nov. 7, 2014

(65) Prior Publication Data

US 2015/0152767 A1 Jun. 4, 2015

(30) Foreign Application Priority Data

Nov. 15, 2013 (EP) .................................... 13193095

(51) Int. Cl.
*F01N 1/00* (2006.01)
*F01N 3/10* (2006.01)
*F01N 3/20* (2006.01)
*F01N 13/00* (2010.01)
*F01N 3/28* (2006.01)

(52) U.S. Cl.
CPC ................ *F01N 3/2066* (2013.01); *F01N 3/10* (2013.01); *F01N 3/2839* (2013.01); *F01N 13/0097* (2014.06); *F01N 2470/18* (2013.01); *Y02T 10/22* (2013.01)

(58) Field of Classification Search
CPC ....... F01N 3/10; F01N 3/2839; F01N 3/2066; F01N 2470/18; F01N 13/0097
USPC ........................................... 60/286, 303, 324
See application file for complete search history.

(56) References Cited

U.S. PATENT DOCUMENTS

| 6,314,722 | B1* | 11/2001 | Matros ................. F01N 3/0231 422/169 |
| 6,444,177 | B1 | 9/2002 | Müller et al. |
| 7,210,287 | B2* | 5/2007 | Bolander .............. F01N 3/2053 422/170 |
| 8,341,946 | B2* | 1/2013 | Harmsen ............ B01D 53/9431 60/274 |
| 8,539,758 | B2 | 9/2013 | Müller-Haas |
| 2003/0051449 | A1 | 3/2003 | Nishiyama et al. |
| 2012/0110989 | A1 | 5/2012 | Laurell et al. |
| 2013/0098002 | A1 | 4/2013 | Danckert et al. |

FOREIGN PATENT DOCUMENTS

| DE | 102008048796 A1 | 3/2010 |
| WO | 9701387 A1 | 1/1997 |
| WO | 2011154254 A1 | 12/2011 |

OTHER PUBLICATIONS

Extended European Search Report Dated Apr. 1, 2014, Application No. 13193095.0-1606, Applicant Volvo Car Corporation. 9 Pages.

* cited by examiner

*Primary Examiner* — Thomas Denion
*Assistant Examiner* — Diem Tran
(74) *Attorney, Agent, or Firm* — Brooks Kushman P.C.

(57) ABSTRACT

A compact exhaust gas aftertreatment device for an internal combustion engine comprises a catalytic converter, wherein the catalytic converter comprises an encapsulating member, a pipe member, an exhaust gas guiding means and two catalytic converter substrates. The exhaust gas aftertreatment device provides very good exhaust gas mixing properties. Additionally, the exhaust gas guiding means is configured to withstand thermal stress due to exposure to hot exhaust gas emissions.

20 Claims, 3 Drawing Sheets

EXHAUST GAS AFTERTREATMENT DEVICE

CROSS-REFERENCE TO RELATED APPLICATIONS

This application claims foreign priority benefits under 35 U.S.C. §119(a)-(d) to European patent application number EP 13193095.0, filed Nov. 15, 2013, which is incorporated by reference in its entirety.

TECHNICAL FIELD

The present disclosure relates to an exhaust gas aftertreatment device for an Internal Combustion Engine (ICE).

BACKGROUND

Today, in order to fulfill current emission legislation, more or less all vehicles with an Internal Combustion Engine (ICE) are provided with an exhaust gas aftertreatment device comprising some kind of catalytic converter.

The catalytic converter for reduction of exhaust gas emissions from an ICE generally consists of a tubular, longitudinal body with an inlet and an outlet, wherein the inlet is arranged on the exhaust side of the ICE, for receiving exhaust gas emissions from the ICE, and an outlet is arranged for discharging exhaust gas emissions treated in the catalytic converter. The inlet is in flow communication with the outlet. Additionally, the catalytic converter generally comprises at least one catalytic converter substrate arranged between the inlet and the outlet of the catalytic converter. A catalytic converter substrate generally comprises a channeled structure which the exhaust gases can pass through while being exposed to the large surface area of the catalytic converter. For petrol engines the most frequently used catalytic converter substrate is generally Three Way Catalyst (TWC), while Diesel Oxidation Catalyst (DOC) and/or Lean NOx Trap (LNT) generally are most frequently used for diesel engines. It is also preferred that the TWC or the DOC/LNT is supplemented by a substrate with selective catalytic reduction (SCR) functionality for improved NOx reduction. The underlying mechanisms and the selection of catalytic converter are not part of the disclosure per se and is not further discussed herein.

However, using more than one catalytic converter substrate can be problematic since catalytic converters often are associated with design restrains due to the limited available space in the engine compartment of passenger cars. Small catalytic converters are preferred from an engine packaging perspective, but small catalytic converters usually means that the flow distance between the inlet and the catalytic converter substrates of the catalytic converter is limited. Limited distance means that the time and distance during which mixing of the exhaust gas emissions can occur is limited. Insufficient mixing of the exhaust gas emissions gives inhomogeneous exhaust gas emission mixture. This might e.g., be problematic for emission gas sensors, arranged in the exhaust gas emission flow, to work properly and give accurate emission measurements.

Other problematic areas for catalytic converters are high back pressure and insufficient heating. Heating of the catalytic converter is crucial since the catalytic converter is most effective at relatively high temperatures. Thus, it is desirable that catalytic converter reaches its optimum operation temperatures as soon as possible. However, at the same time high temperatures, and big fluctuations in temperature, are stressful for the components of the catalytic converter. Different approaches are used in order for the catalytic converter to reach desired operation temperature as quickly as possible, e.g., the combustion and fuel injection of the engine may be controlled for generating additional heat or the catalytic converter may be arranged as close to the engine exhaust gas emissions outlet as possible, where the exhaust gas emissions are warmest.

Insufficient mixing of the exhaust gas emissions are of particular interest if a substrate with SCR functionality is used. For substrates with SCR functionality, a liquid or gaseous reductant is introduced in the exhaust gas emission flow in order for the reductant and exhaust gas emissions to mix before the substrate with SCR functionality. Consequently, sufficient mixing is essential for the substrate with SCR functionality to work properly.

US 2012/0110989, herein considered to be incorporated by reference, discloses an exhaust-gas aftertreatment device for an internal combustion engine, wherein the device comprises a catalytic converter comprising a tubular member, a pipe member, one catalytic converter substrate and a deflector means. By utilizing the pipe member and the deflector means, the catalytic converter arrangement according to US 2012/0110989 provides prolonged mixing period before the single catalytic converter for improved efficiency. Also, the pipe member and the deflector means are configured to reduce the amount of emissions in liquid form before the exhaust gas emissions reaches the single catalytic converter by using heat transferred from the exhaust gas emissions to the pipe member and the deflector means. This effect is additionally promoted by arranging a layer of porous material between the downstream side of the pipe member and the deflector means.

However, there is still a need for further improvements.

SUMMARY

An object of the present disclosure is to provide an improved exhaust gas aftertreatment device comprising a catalytic converter for an ICE, where some of the previously mentioned problems are partly avoided. The disclosure provides a compact catalytic converter comprising two catalytic converter substrates. Even though the catalytic converter is compact and comprises two catalytic converter substrates, the catalytic converter of the exhaust gas aftertreatment device provides improved mixing properties. Additionally, another object of the present disclosure is to provide an exhaust gas guiding means overcoming the problem with thermally induced stress in guiding means of catalytic converters.

The exhaust gas aftertreatment device comprises an catalytic converter, wherein the catalytic converter comprises an encapsulating member. The encapsulating member comprises a first end portion and a second end portion, wherein the second end portion is arranged in the opposite end of the catalytic converter as the first end portion, and a midsection of the encapsulating member arranged there between.

In a preferred development of the catalytic converter, the encapsulating member can have a tubular cross sectional shape, but it is also possible to use an elliptic cross sectional shape, a cross sectional shape being more or less rectangular or any other suitable shape such as an irregularly shaped cross sectional shape. The form of the encapsulating member is dependent on available space in the engine compartment and other design restraints.

The outside of the encapsulating member defines the outer perimeter of the catalytic converter, wherein the inside of the encapsulating member defines a converter volume of the catalytic converter. Within the encapsulating member, a first catalytic converter substrate and a second catalytic converter substrate are arranged.

The exhaust gas aftertreatment device, and the catalytic converter of the exhaust gas aftertreatment device, are characterized in that within the converter volume, starting from the first end portion, the following is provided in order:

a first volume being defined between the first end portion of the encapsulating member and the first catalytic converter substrate, the first catalytic converter substrate being arranged between the first volume and a subsequently provided second volume, the second volume being defined between the first catalytic converter substrate and the second catalytic converter substrate, wherein the first volume is in fluid communication with the second volume through the first catalytic converter substrate, the second catalytic converter substrate being arranged between the second volume and a subsequently provided third volume, and the third volume being defined between the second catalytic converter substrate and the second end portion of the encapsulating member, wherein the third volume is in fluid communication with the second volume through the first catalytic converter substrate.

Consequently, in order to clearly describe embodiments of the disclosure the first, second and third volumes are defined as being delimited by the outer delimitation of the first and second catalytic converter substrates, even though in reality exhaust gas encapsulated by a catalytic converter substrate is able to flow through the substrate.

Additionally, the catalytic converter of the exhaust gas aftertreatment device comprises an exhaust gas guiding means and a pipe member within said encapsulating member. By arranging the exhaust gas guiding means and the pipe member as will be described, the flow path of the exhaust gas emissions will be prolonged which is beneficial from an exhaust gas mixing perspective.

The exhaust gas guiding means is arranged in the second volume of the catalytic converter. A first open section of the exhaust gas guiding means is connected to the pipe member, as will be further described below, and seals against the pipe member, preferably the edge of the pipe member. A second open section of the Exhaust gas guiding means is arranged adjacent the first catalytic converter substrate, whereas the second open section of the exhaust gas guiding means seals against the encapsulating member. This arrangement divides the second volume into a first part of the second volume and a second part of the second volume. The first part of the second volume is provided adjacent to the first catalytic converter substrate and the second part of the second volume is provided adjacent to the second catalytic converter substrate.

According to a development of the exhaust gas aftertreatment device, comprising the catalytic converter, the pipe member is extending in the longitudinal direction of the catalytic converter and is located centrally in the encapsulating member, more precisely centrally within the second substrate. Arranging the pipe member centrally in the second substrate encapsulating the pipe member can be advantageous in order to have an even and flow of exhaust gas emissions through the catalytic converter. However, arranging the pipe member in another way may give other advantages.

According to a preferred development of the disclosure, the pipe member has the same length as the second catalytic converter substrate. However, it is also possible to provide the end portion of the pipe member adjacent to the third volume with an outlet funnel arrangement for control of the flow behavior of the exhaust gas emissions when entering the third volume.

The cross sectional area of the first open section of the exhaust gas guiding means is smaller than the cross sectional area of the second open section of the exhaust gas guiding means. Consequently, the exhaust gas guiding means is arranged as a funnel placed after the first catalytic converter substrate such that a flow of exhaust gas emissions, after passing the first catalytic converter substrate, will be collected in the exhaust gas guiding means and guided by the tapered shape of the exhaust gas guiding means to and through the pipe member. The pipe member is arranged within the second converter substrate, and consequently the exhaust gas emissions will be guided, from the second volume to the third volume, without passing the second catalytic converter substrate. Since the cross sectional area of the second open section of the exhaust gas guiding means is larger than the cross sectional area of the first open section and the cross sectional area of the pipe member there will be an increase in the exhaust gas flow rate over the exhaust gas guiding means and the subsequently arranged pipe member. The increase in exhaust gas flow rate is beneficial from an exhaust gas emission mixing perspective.

According to the disclosure, a first port is connected to the first end portion for fluid communication with the converter volume and a second port is connected to the midsection portion of the encapsulating member for fluid communication with the second part of the second volume.

In a preferred development of the catalytic converter, the first port is configured to receive exhaust gas emissions from the ICE. The exhaust gas emission flow will according to this development be directed from the first port to the second port. The flow will according to this development be directed in a first flow direction A through the first port and into the first volume. From the first port the exhaust gas flow will thereafter pass the first catalytic converter substrate into the first part of the second volume. The exhaust gas emission flow is thereafter directed from the first part of the second volume, through the exhaust gas guiding means and the pipe member, to the third volume. The flow through the exhaust gas guiding means and the pipe member will be directed in a first flow direction A.

According to the disclosure the second end portion of the encapsulating member forms a deflector means, configured to deflect the exhaust gas emissions, such that the direction of the exhaust gas flow is changed.

Once having entered the third volume in the first flow direction A, the exhaust gas emission flow will reach the deflector means, at which the flow direction of the exhaust gas emission will be deflected into a second flow direction B. The second flow direction B is preferably substantially opposite to the first flow direction A. The change of flow direction will contribute to the mixing of the exhaust gas emissions.

After the change of flow direction into the second flow direction B the exhaust gas emissions will flow from the third volume into the second part of the second volume through the second catalytic converter substrate. Hence, as mentioned, by using the exhaust gas guiding means, the pipe member and the deflector means such that the exhaust gas emission flow, after passing the first catalytic converter substrate, will flow through the exhaust gas guiding means, the pipe member and be deflected in the third volume by the deflector means before reaching the second catalytic converter substrate instead of flowing directly to the second catalytic converter substrate, the distance the exhaust gas emissions has to travel after passing the first catalytic converter substrate is prolonged.

This is beneficial for the mixing of the exhaust gas emissions. The prolonged mixing period before the exhaust gas emissions reaches the second catalytic converter will improve the efficiency of the second catalytic converter substrate.

In this development of the disclosure the exhaust gas emissions will be discharged from the second part of the second volume through the second port in a third flow direction C.

In developments of the exhaust gas aftertreatment device where the exhaust gas emissions enter the first port in a first flow direction A and are discharged from the exhaust gas aftertreatment device in a third flow direction C, and where the exhaust gas aftertreatment device is used for treating exhaust gas emissions from a diesel engine, the first catalytic converter substrate is a preferably a Diesel Oxidation Catalyst and/or Lean NOx Trap, referred to as DOC/LNT. If a petrol engine is used the first catalytic converter substrate is preferably a Three Way Catalyst (TWC). Independently of if the exhaust gas aftertreatment device is used for a diesel or petrol engine, the second catalytic converter substrate is preferably a substrate with selective catalytic reduction (SCR) functionality. In this context, a substrate with SCR functionality may be any substrate, filter, monolith or like that can be provided with a coating with selective catalytic reduction functionality and that has the essential properties such as that a gaseous media can flow through the substrate that is required of such substrate. Receiving exhaust gas emissions in the first port and discharging treated exhaust gas emissions from the second port has the advantage that the flow path for the first port to the second port is optimized for flow in that direction, e.g., in regards of mixing properties.

The catalytic functionality of the first and second catalytic converter substrates are not part of the disclosure per se, and variations known for a person skilled in the art are considered to be within the scope of the inventive concept.

However, according to another development of the disclosure reversed flow can also be used. For developments where reversed flow is used the exhaust gas flow is directed from the second port to the first port. In this development the second catalytic converter will be the first catalytic converter the exhaust gases passes and the first catalytic converter will be arranged downstream of the second catalytic converter.

Consequently, the second port will receive exhaust gas emissions from an ICE and the exhaust gas emissions will be discharged from the first port. In this development of the disclosure the second catalytic converter substrate is preferably a DOC/LNT for diesel engines and a TWC for petrol engines. The first catalytic converter substrate is preferably a substrate with SCR functionality.

Developments of the disclosure where the exhaust gas flow is directed from the second port to the first port is not further discussed herein, but one should bear in mind that this is a possible development of the disclosure, with accompanying advantages and disadvantages.

The advantages, disadvantages and effects of selecting possible catalytic converter substrates are not further disclosed herein since this is common knowledge for a person skilled in the art.

In SCR systems a reductant is added to the exhaust gas flow in order for the substrate with SCR functionality to reduce NOx. The reductant, such as e.g., urea, anhydrous ammonia or aqueous ammonia, is added to the exhaust gas emission flow and can be absorbed by the downstream arranged substrate with SCR functionality where it reacts with the NOx of the exhaust gas emission. If the reductant is in liquid form the reductant is generally sprayed into the exhaust gas emission flow as small droplets, and it is desirable that the reductant is vaporized before reaching the substrate with SCR functionality. Good mixing of the exhaust gases with the added reductant, warm engine components and sufficient time before reaching the substrate with SCR functionality are all factors which contribute to high degree of evaporation. Gaseous reductant may be added either from any form of gas container or by gasification of a solid substrate. Consequently, the good mixing properties of the exhaust gas aftertreatment device are advantageous.

If a substrate with SCR functionality is present, a reductant must be added to the exhaust gas emission flow upstream of the substrate with SCR functionality. Consequently, in preferred developments of the exhaust gas aftertreatment device the reductant is either injected in the exhaust gas flow within the volume of the pipe member or within the volume of the exhaust gas guiding means. The reductant is injected into the exhaust gas emission flow by means of an injector pipe. The injector pipe is connected to a reductant tank and other necessary components for executing the injection and for controlling the injection. The injector pipe can be inserted through the encapsulating member either by extending through the deflector means of the second end portion or by extending through the encapsulating member, and if so preferably the midsection of the encapsulating member. In a development where the injector pipe is located within the pipe member, it is preferred that the injector pipe is located substantially centrally in the pipe member, extending in the longitudinal direction thereof. In the development where the injector pipe is extending through the midsection of the encapsulating member, the injector pipe is protruding into the volume of the pipe member, or within the volume of the exhaust gas guiding means, in a direction being substantially perpendicular to the first flow direction A.

By injecting the reductant within the volume of either the pipe member or the exhaust gas guiding means it is ensured that the reductant is sufficiently mixed with exhaust gas emission flow. The closer to the first catalytic converter the reductant is injected, the better mixing and the longer the time for evaporation of the reductant before it reaches the second catalytic converter, preferably being a substrate with SCR functionality if the exhaust emission flow is directed from the first port to the second port.

According to yet a development of the exhaust gas aftertreatment device, the deflector means is provided with a porous material. The porous material can be provided to absorb and thereby facilitate retention of any liquid substance in the exhaust gas emission until the liquid substance is evaporated, e.g., by that the porous material has been heated such that any absorbed liquid substance is evaporated into gaseous form. According to a preferred development of the disclosure, the reductant can be injected in the exhaust gas emission flow upstream of the porous material. Consequently, unevaporated reductant can be absorbed by the porous material until it is evaporated. The porous material may consist of a mesh structure, such as for a catalytic converter substrate, or be of any other suitable structure.

According to one development of the exhaust gas aftertreatment device, the porous material can be arranged at a distance from the second end portion such that an open volume is formed between the porous material and the second end portion.

Furthermore, the exhaust gas aftertreatment device comprises an exhaust gas guiding means. The exhaust gas guiding means is provided within the converter volume, such that the exhaust gas guiding means can guide the exhaust gas flow as is desired.

The exhaust gas guiding means may comprise a resilient section that is configured to change shape when the exhaust gas guiding means are exposed to hot exhaust gas emissions. This can prevent that stress or tension in said guiding means is created on the inside of the encapsulating member due to thermal stress induced by the hot exhaust gas emissions.

According to one preferred embodiment of the disclosure, the resilient section of the exhaust gas guiding means comprises a curved section between the first open section and the second open section, wherein said curved section can change degree of curvature and thus take up heat induced stress. The circumferential surface of the exhaust gas guiding means comprising the curved section is preferably shaped to be outwardly concave, such that an inwardly, convex tapering of the passage between the second open section and the first open section is provided.

According to a another development of the exhaust gas guiding means the resilient section of the exhaust gas guiding means can be provided with a circumferential membrane, configured to absorb stress induced in the component. The circumferential membrane may be provided anywhere along the circumferential surface of the exhaust gas guiding means, but according to a preferred embodiment the membrane can be provided at the second open section, adjacent to where the exhaust gas guiding means seals against the midsection of the encapsulating member.

According to yet another development of the exhaust gas guiding means, the resilient section of the exhaust gas guiding means can be provided with a corrugated circumferential section. Also the corrugated circumferential section can be provided anywhere along the circumferential surface of the exhaust gas guiding means, but preferably adjacent to where the exhaust gas guiding means seals against the midsection of the encapsulating member. Using a corrugated circumferential section, also providing improved ability to absorb heat induced stress, has the advantage that the corrugated section can be manufactured from the same metallic sheet used to form the exhaust gas guiding means.

As stated, the exhaust gas guiding means can preferably be used as the exhaust gas guiding means of the exhaust gas aftertreatment device. However, the exhaust gas guiding means can also be used in other exhaust gas aftertreatment devices. Problems due to that components of exhaust gas aftertreatment devices are exposed to hot exhaust gas emissions, causing thermal expansion of exposed components, is common for all exhaust gas aftertreatment devices.

As will be realised, it is possible to modify the disclosure in various obvious respects, all without departing from the scope of the appended claims. Accordingly, the accompanying schematical drawings and the description thereto are to be regarded as illustrative in nature and not restrictive. Reference signs mentioned in the claims should not be seen as limiting the extent of the matter protected by the claims, and their sole function is to make the claims easier to understand.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
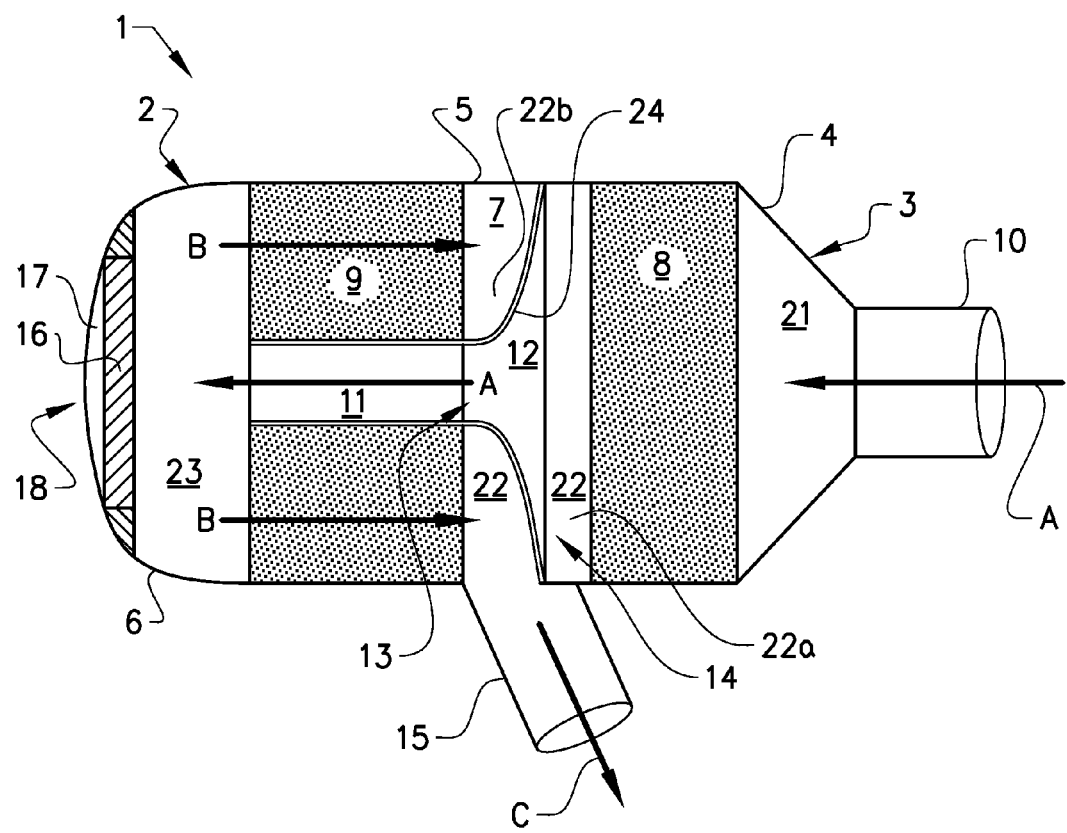
FIG. 1 shows a schematic view of a development of the exhaust gas aftertreatment device, according to the present disclosure.

FIG. 1 shows an embodiment of an exhaust gas aftertreatment device 1 for an Internal Combustion Engine (ICE) (not shown), comprising a catalytic converter 2. The catalytic converter 2 comprises an encapsulating member 3. In turn, the encapsulating member 3 comprises a first end portion 4, a second end portion 6, wherein the second end portion 6 is provided at the opposite end of the catalytic converter 2 as the first end portion 4, and a midsection 5, wherein the midsection 5 is provided between the first end portion 4 and the second end portion 6 such that the midsection 5 connects the first end portion 4 with the second end portion 6. The outside of the encapsulating member 3 defines an outer perimeter of the catalytic converter 2 and the inside of the encapsulating member 3 defines a converter volume 7 of the catalytic converter 2. According to the disclosure the cross sectional area of the encapsulating member 3 can be of any suitable shape, such as round, rectangular, square etc. A first catalytic converter substrate 8 and a second catalytic converter substrate 9 are arranged within the encapsulating member 3. The first catalytic converter substrate can preferably be a Diesel Oxidation Catalyst (DOC) and/or a Lean NOx Trap (LNT) or a Three Way Catalyst (TWC) and the second catalytic converter substrate can preferably be a substrate with selective catalytic reduction (SCR) functionality.

The functionality of the possible catalytic substrates, used as first and second catalytic converter substrates, are not described herein since this is considered to be part of common knowledge.

According to the embodiment of the disclosure shown in FIG. 1, the converter volume 7 is divided in a first volume 21, a second volume 22 and a third volume 23, wherein the first volume 21 is provided adjacent to the first catalytic converter substrate 8, the third volume 23 is provided adjacent to the second catalytic converter substrate 9 and the second volume 22 is provided between the first catalytic converter substrate 8 and the second catalytic converter substrate 9.

Additionally, an exhaust gas guiding means or device 12 is arranged within the encapsulating member 3 in the second volume 22. The exhaust gas guiding means 12 comprises a first open section 13 and a second open section 14, wherein the first open section 13 is substantially smaller than the second open section 14. The first and second open sections 13, 14 are connected by a circumferential surface. As shown in FIG. 1 the exhaust gas guiding means 12 comprises a curved section 24 between the first open section 13 and the second open section 14. The curved section 24 is provided such that when the exhaust gas guiding means 12 is exposed to hot exhaust gas emissions, which if the exhaust gas guiding means 12 is provided in a metallic material can cause thermal expansion of the exhaust gas guiding means 12, the curved section 24 can absorb stress created in the metallic material due to said thermal expansion, and thus prevent excess force on the inside of the encapsulating member 3. The curved section 24 makes the exhaust gas guiding means 12 resilient to hot exhaust gas emissions.

As is obvious since the first open section 13 has smaller cross sectional area than the second open section 14, the curved section 24 of the exhaust gas guiding means 12 is slightly tapered. According to FIG. 1, the circumferential surface of the exhaust gas guiding means 12 is tapered in an inwardly convex manner.

The first open section 13 is arranged to a pipe member 11 such that a circumferential edge of the first open section 13 seals against the circumferential edge of the pipe member 11. The second open section 14 is circumferentially arranged to the midsection 5 of the encapsulating member 3 such that the second open section 14 seals against the midsection 5 of the encapsulating member 3. This arrangement provides that the second volume 22 is divided into a first part of the second volume 22a and a second part of the second volume 22b. The cross sectional area of the pipe member 11 as well as the exhaust gas guiding means 12 can be of any suitable shape, such as round, rectangular, square etc., as long as the exhaust gas guiding means 12 can be arranged to seal against the pipe member 11 and the midsection 5 of the encapsulating member 3.

According to the disclosure, the pipe member 11 shown in FIG. 1 is provided within the second catalytic converter substrate 9, wherein the pipe member 11 is extending in the longitudinal direction of the catalytic converter 2, such that said pipe member 11 is connecting the first part of the second volume 22a with the third volume 23. The pipe member 11 provides improved mixing of the exhaust gases by guiding said exhaust gases in a first flow direction A from said first part of the second volume 22a to said third volume 23 by prolonging the mixing period before the exhaust gases reaches the second catalytic converter substrate 9. Thus, the pipe member 11 enables that the catalytic converter 2, comprising two catalytic converter substrates 8,9, can be designed to be more compact without having negative impact on the exhaust gas emissions mixing characteristics. According to the embodiment of the catalytic converter 2 disclosed in FIG. 1 the pipe member 11 is arranged substantially centrally in the second catalytic converter substrate 9.

Additionally, according to the embodiment of the disclosure shown in FIG. 1 a first port 10 is arranged in connection to the first volume 21. According to the embodiment in FIG. 1 the first port 10 is acting as an inlet port receiving exhaust gases from the ICE (not shown). The exhaust gases will enter the first port in a first flow direction A. A second port 15 is arranged in fluid connection to the second part of the second volume 22b, wherein the second port 15 according to the embodiment in FIG. 1 is acting as an outlet port discharging exhaust gases after catalytic conversion thereof. The discharged exhaust gases will flow through the second port in a third flow direction C. The first port 10 and the second port 15 can be formed together with the encapsulating member 3 or be separate components arranged to the encapsulating member 3.

Additionally, according to the embodiment of the disclosure shown in FIG. 1 a portion of the second end portion 6 constitutes a deflector means 18. The deflector means 18 deflects the exhaust gases from the pipe member 11, wherein the exhaust gases approach the deflector means 18 in the first flow direction A, and are deflected in a second flow direction B. According to the embodiment in FIG. 1, the second flow direction B is substantially opposite to the first flow direction A. Mixing of the exhaust gases is further promoted by this deflection, resulting in improved catalytic conversion by the second catalytic converter substrate 9.

Finally, the catalytic converter 2 comprises a porous material 16. According to the embodiment of the disclosure shown in FIG. 1, the porous material is 16 provided at the end of the third volume 23 provided furthest away from the first port 10, adjacent to the deflector means 18. The porous material 16 is arranged between the pipe member 11 and the portion of the second end portion 6 constituting the deflector means 18, such that a flow flowing through the pipe member 11 in the first flow direction A is directed at the porous material 16 before reaching the deflector means 18. The porous material is arranged at a distance from the deflector means 18 such that a space 17 is formed between the porous material 16 and the deflector means 18.

According to the embodiment of the exhaust gas aftertreatment device 1 shown in FIG. 1, the exhaust gas aftertreatment device is configured to function as follows:

Exhaust gases from the ICE (not shown) enter the catalytic converter 2 of the exhaust gas aftertreatment device 1 through the first port 10 in a first flow direction A. When entering the first volume 21 the exhaust gas flow rate is decreased, enabling the exhaust gases to flow through the subsequently arranged first catalytic converter substrate 8 at lower rate. After the first catalytic converter substrate 8, the exhaust gases enter the first part of the second volume 22a. The subsequently arranged exhaust gas guiding means 12 guides the exhaust gas flow into the pipe member 11. The cross sectional area of the pipe member 11 and the first open section 13 of the exhaust gas guiding means 12, wherein the first open section 13 is arranged to the edge of the pipe member 11, are smaller than the cross sectional area of the second open section 14 of the exhaust gas guiding means 12, resulting in an increased exhaust gas flow rate through the pipe member 11. The increase in exhaust gas flow rate will improve the mixing of the exhaust gas, thus contributing to improved catalytic conversion. The exhaust gas emissions will flow through the pipe member in a first flow direction A into the third volume 23, wherein the flow rate once again will be decreased. According to FIG. 1 the porous material 16 is arranged in the flow direction A downstream of the pipe member 11, such that the exhaust gas flow will pass through the porous material 16. After passing the porous material 16, the exhaust gases reaches the deflector means 18. The deflector means will redirect the exhaust gas flow in the second flow direction B. The exhaust gas emissions will thereafter pass through the second catalytic converter substrate 9, in the second flow direction B, and into the second part of the second volume 22b. Finally, the exhaust gas emissions will exit through the second port 15 in the third flow direction C. The catalytic converter 2 can also be provided without the porous material.

Figure 2A:
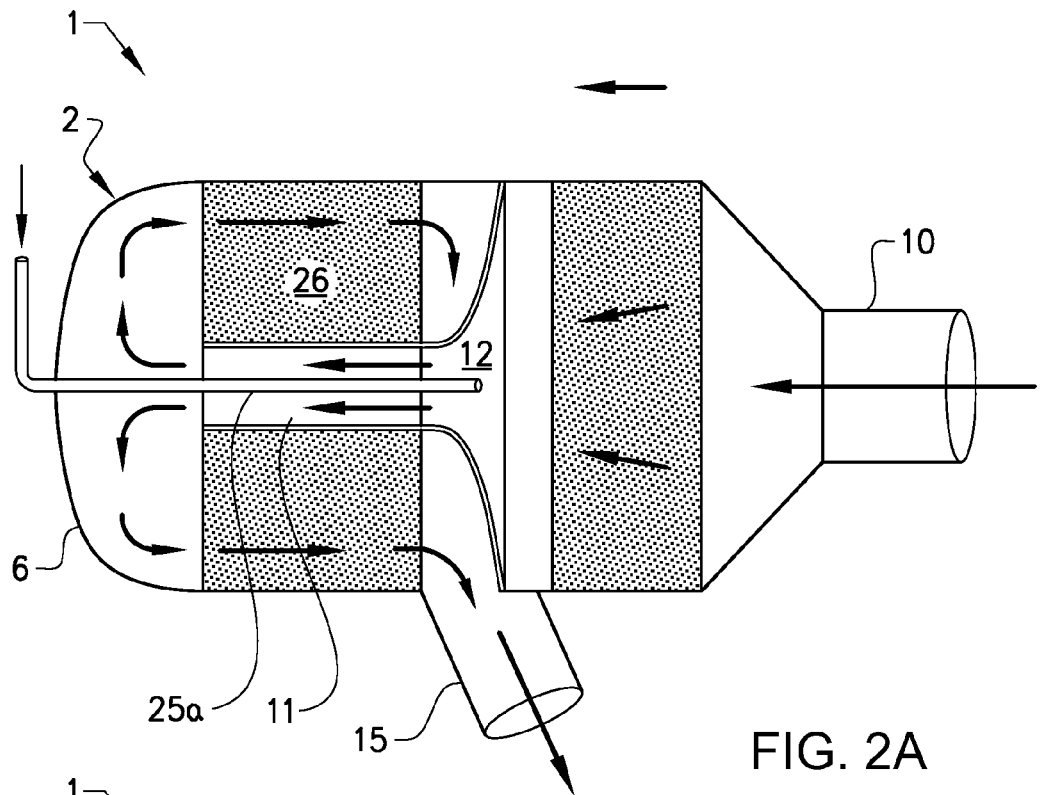
FIG. 2A and FIG. 2B show two schematic views of the exhaust gas aftertreatment device, comprising two developments of reductant injection arrangements, according to the disclosure.
Figure 2B:
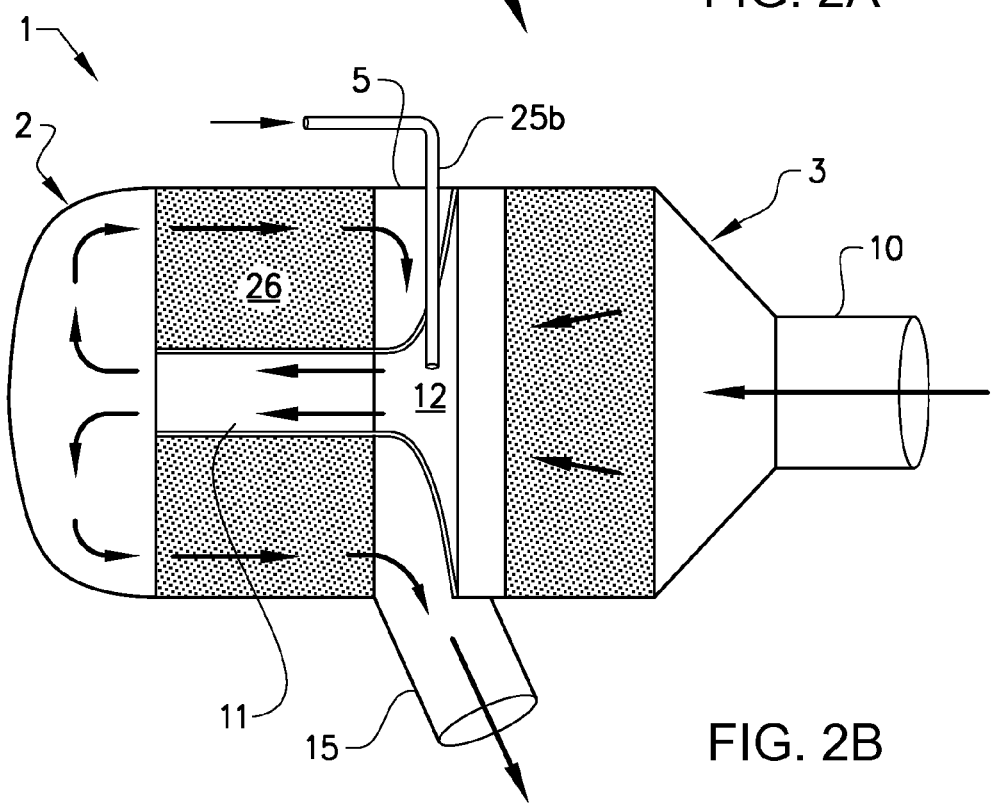

FIG. 2A and FIG. 2B show two schematic side views of two embodiments of the exhaust gas aftertreatment device 1, each comprising one possible development of a reductant injection arrangement. According to FIGS. 2A and 2B, the second converter substrate is a substrate with SCR functionality 26. The presence of a substrate with SCR functionality 26 requires that a reductant, typically anhydrous ammonia, aqueous ammonia urea, etc., is added to the exhaust gas emissions flow and is absorbed onto the downstream arranged substrate with SCR functionality. Operation and the functionality of a substrate with SCR functionality are not further described herein since this is common knowledge and does not form part of the disclosure. According to the development of the disclosure shown in FIG. 2A, a first example of an injector pipe 25a is provided longitudinally in the catalytic converter 2, wherein the injector pipe 25a enters the catalytic converter 2 through the second end portion 6, such that a reductant can be added to the exhaust gas emissions before the substrate with SCR functionality 26. The reductant may preferably be added within the volume of the exhaust gas guiding means 12 or the volume of the pipe member 11, such that the beneficial mixing properties provided by the exhaust gas guiding means 12 and the pipe member 11 are facilitated to provide high degree of mixing between the reductant and the exhaust gas emissions. Also, this will improve the evaporation of the reductant since it will be exposed to hot exhaust gas emissions and possibly heated components for a longer period of time. Further, according to FIG. 2A, the injector pipe 25a is provided such that it extends substantially centrally of the pipe member 11, into the volume of the exhaust gas guiding means 12.

According to the development of the exhaust gas aftertreatment device 1 shown in FIG. 2B, a second example of an injector pipe 25b is entering the volume of the exhaust gas guiding means 12 in a direction substantially perpendicular to the extension of the catalytic converter 2. In the development of the disclosure according to FIG. 2B, the injector pipe 25b is inserted through the midsection 5 of the encapsulating member 3. This arrangement allows the reductant to be added to the exhaust gas emission flow within the area of the exhaust gas guiding means 12. According to a further development of the exhaust gas aftertreatment device 1, the second example of an injector pipe can also be provided such that the reductant is injected to the exhaust gas emission flow within the volume of the pipe member 11.

FIG. 2A and FIG. 2B show developments of the exhaust gas aftertreatment device 1 where the first port 10 receives exhaust gas emissions from an ICE (not shown) and exhaust gas emissions are discharged through the second port 15. In view of this, the intended exhaust gas flow is indicated by arrows in before mentioned figures. Also, in the developments of the exhaust gas aftertreatment device shown in FIG. 2A and FIG. 2B, any injector pipe is preferably arranged to a reductant tank (not shown) and to associated components for controlling and enabling the injection of reductant. This is not further described herein since this is common knowledge and does not form part of the disclosure.

Figure 3A:
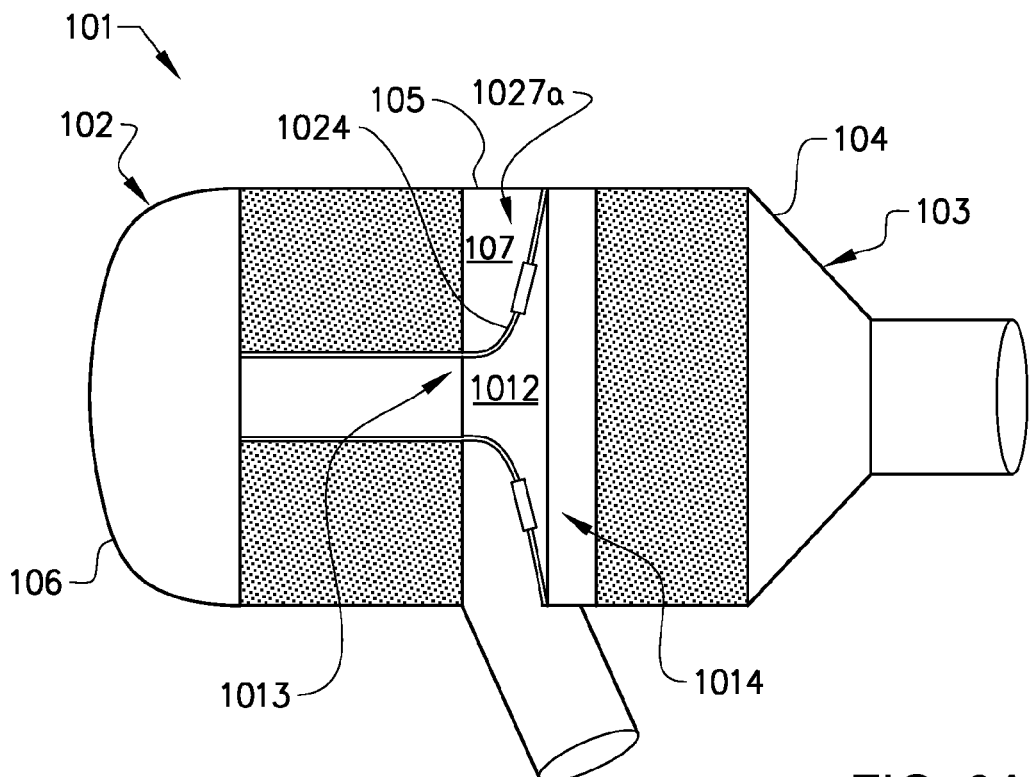
FIG. 3A and FIG. 3B show two schematic views of the exhaust gas aftertreatment device comprising two developments of exhaust gas guiding means, according to the disclosure.
Figure 3B:
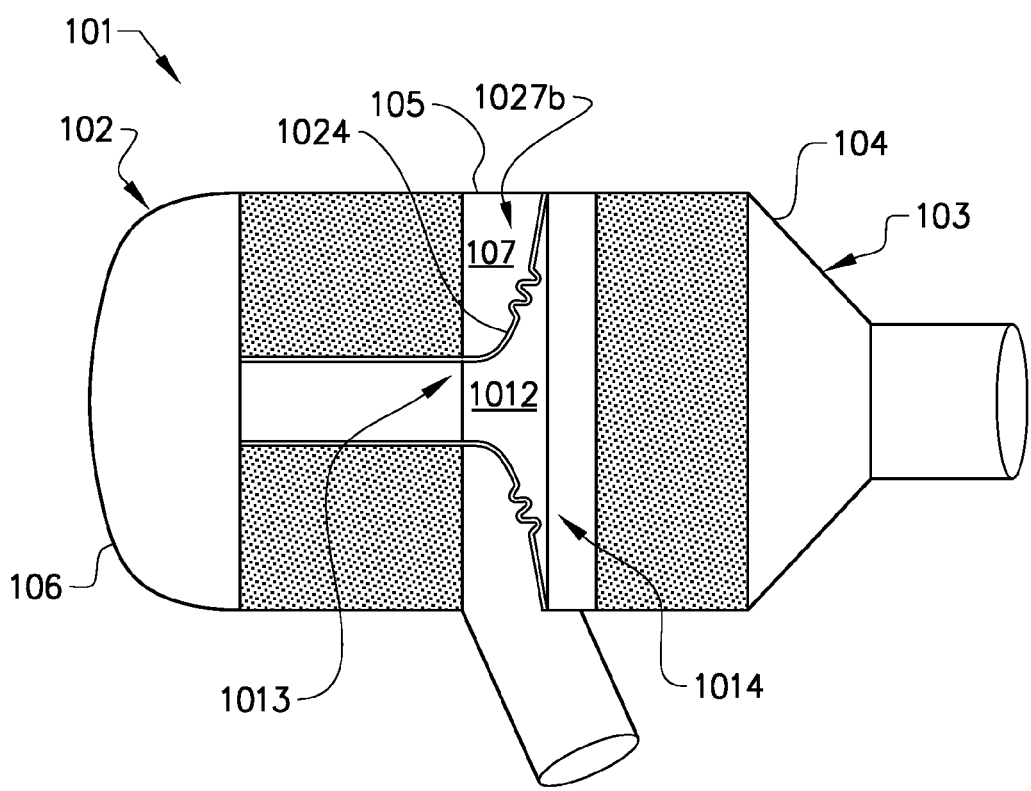

FIG. 3A and FIG. 3B show two schematic side views of the exhaust gas aftertreatment device 101 comprising two developments of exhaust gas guiding means 1012 according to the disclosure. According to the development of the exhaust gas aftertreatment device 101 shown in FIG. 3A and FIG. 3B, a curved section 1024 is provided between the first open section 1013 and the second open section 1014 of the exhaust gas guiding means 1012. In the developments of the disclosure shown in FIG. 3A and FIG. 3B the entire circumferential surface connecting the first open section 1013 to the second open section 1014 is curved. It is also possible that just a smaller section of the circumferential surface is curved. The curved section 1024 connects the first open section 1013 with the second open section 1014 by forming a circumferential surface of the exhaust gas guiding means 1012. Additionally, in the development of the exhaust gas aftertreatment device 101 shown in FIG. 3A and FIG. 3B, the curved section 1024 is provided with a circumferential section 1027a, 1027b, wherein the circumferential section 1027a, 1027b is provided substantially in the middle of the curved section 1024. The circumferential section 1027a, 1027b is preferably configured to add additional resilience, or in other ways desirable, properties to the exhaust gas guiding means 1012.

In FIG. 3A, the circumferential section 1027a is in the form of a membrane, which membrane can be configured to add additional ability to withstand thermal expansion, or add other desirable properties to the exhaust gas guiding means 1012, and in FIG. 3B, the circumferential section 1027h is in the form of a corrugated section of the curved section 1024, which also can improve the resilience of the curved section 1024.

Finally, the operations of a catalytic converter and additional components of catalytic converters not described herein are considered to be part of common knowledge and do not form part of, nor have any impact on, the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exhaust gas aftertreatment device for an internal combustion engine, the exhaust gas aftertreatment device comprising:
    a catalytic converter including:
        an encapsulating member comprising first and second opposing end portions, and a midsection portion arranged there between, wherein an outside of the encapsulating member defines an outer perimeter of the catalytic converter, and an inside of the encapsulating member defines a converter volume of the catalytic converter;
        a first catalytic converter substrate and a second catalytic converter substrate arranged within the converter volume of the catalytic converter; and
        a first port connected to the first end portion for fluid communication with the converter volume;
        wherein, within the converter volume, starting from the first end portion, the following are provided in order:
            a first volume defined between the first end portion and the first catalytic converter substrate;
            the first catalytic converter substrate being arranged between the first volume and a subsequently provided second volume;
            the second volume being defined between the first catalytic converter substrate and the second catalytic converter substrate, wherein the first volume is in fluid communication with the second volume through the first catalytic converter substrate;
            the second catalytic converter substrate being arranged between the second volume and a subsequently provided third volume; and
            the third volume being defined between the second catalytic converter substrate and the second end portion, wherein the third volume is in fluid communication with the second volume through the second catalytic converter substrate;
    wherein the exhaust gas aftertreatment device further comprises an exhaust gas guiding means and a pipe member within the encapsulating member, the pipe member being arranged within the second converter substrate and connecting the second volume with the third volume for fluid communication, and the exhaust gas guiding means being arranged in the second volume;
    wherein a first open section of the exhaust gas guiding means is connected to the pipe member and sealed against the pipe member, and a second open section of the exhaust gas guiding means is arranged adjacent the first catalytic converter substrate;
    wherein the second open section of the exhaust gas guiding means is sealed against the midsection portion of the encapsulating member such that the second volume is divided into a first part of the second volume and a second part of the second volume;

wherein the first part of the second volume is provided adjacent to the first catalytic converter substrate and the second part of the second volume is provided adjacent to the second catalytic converter substrate;

wherein a second port is connected to the midsection portion of the encapsulating member for fluid communication with the second part of the second volume;

wherein the cross sectional area of the first open section of the exhaust gas guiding means is smaller than the cross sectional area of the second open section of the exhaust gas guiding means; and wherein the exhaust gas guiding means comprises a resilient section that is configured to change shape due to change in heat load from exhaust gas emissions, for hindering excess force on the inside of the encapsulating member.

2. The exhaust gas aftertreatment device according to claim 1 wherein the resilient section of the exhaust gas guiding means comprises a curved section between the first open section and the second open section, the curved section being configured to change shape due to change in heat load from the exhaust gas emissions, for hindering excess force on the inside of the encapsulating member.

3. The exhaust gas aftertreatment device according to claim 1 wherein the pipe member is located centrally in the encapsulating member of the catalytic converter, and extends in the longitudinal direction thereof.

4. The exhaust gas aftertreatment device according to claim 1 wherein the second end portion forms a deflector means configured to deflect exhaust gas emissions.

5. The exhaust gas aftertreatment device according to claim 1 wherein the catalytic converter is configured to direct exhaust gas emission flow from the first port to the second port.

6. The exhaust gas aftertreatment device according to claim 5 wherein the first catalytic converter substrate comprises a Diesel Oxidation Catalyst and/or a Lean NOx Trap.

7. The exhaust gas aftertreatment device according to claim 5 wherein the first catalytic converter substrate comprises a Three Way Catalyst.

8. The exhaust gas aftertreatment device according to claim 5 wherein the second catalytic converter substrate comprises selective catalytic reduction functionality.

9. The exhaust gas aftertreatment device according to claim 6 wherein the second catalytic converter substrate comprises selective catalytic reduction functionality.

10. The exhaust gas aftertreatment device according to claim 7 wherein the second catalytic converter substrate comprises selective catalytic reduction functionality.

11. The exhaust gas aftertreatment device according to claim 1 wherein the catalytic converter is configured to direct exhaust gas emission flow from the second port to the first port.

12. The exhaust gas aftertreatment device according to claim 11 wherein the second catalytic converter substrate comprises a Diesel Oxidation Catalyst and/or a Lean NOx Trap.

13. The exhaust gas aftertreatment device according to claim 11 wherein the second catalytic converter substrate comprises a Three Way Catalyst.

14. An exhaust gas guiding means for guiding of an exhaust gas emission flow within an exhaust gas aftertreatment device for an internal combustion engine, wherein the exhaust gas aftertreatment device includes a catalytic converter that comprises an encapsulating member with first and second opposing end portions, and a midsection portion there between, and wherein an outside of the encapsulating member defines an outer perimeter of the catalytic converter, and an inside of the encapsulating member defines a converter volume of the catalytic converter, the exhaust gas guiding means comprising:

a first open section;

a second open section; and a circumferential surface connecting the first open section with the second open section, such that an enclosed passage is formed between the second open section and the first open section, the circumferential surface comprising a resilient section that is configured to change shape due to change in heat load from the exhaust gas emissions, for hindering excess force on the inside of the encapsulating member;

wherein the first open section has a smaller cross sectional area than the second open section, and the exhaust gas guiding means is adapted to be provided within the converter volume of the catalytic converter.

15. The exhaust gas guiding means according to claim 14 wherein the exhaust gas guiding means comprises a curved section that is configured to change shape due to change in heat load from the exhaust gas emissions, for hindering excess force on the inside of the encapsulating member.

16. An exhaust gas aftertreatment device for an internal combustion engine, the exhaust gas aftertreatment device comprising:

a catalytic converter including an encapsulating member with first and second opposing end portions, and a midsection portion there between, wherein an outside of the encapsulating member defines an outer perimeter of the catalytic converter, and an inside of the encapsulating member defines a converter volume of the catalytic converter; and an exhaust gas guiding means provided within the converter volume of the catalytic converter for guiding an exhaust gas emission flow, the exhaust gas guiding means including a first open section, a second open section, and a circumferential surface connecting the first open section with the second open section such that an enclosed passage is formed between the second open section and the first open section, the circumferential surface comprising a resilient section that is configured to change shape due to change in heat load from the exhaust gas emissions for hindering excess force on the inside of the encapsulating member, wherein the first open section has a smaller cross sectional area than the second open section.

17. The exhaust gas aftertreatment device according to claim 16 wherein the circumferential surface of the exhaust gas guiding means comprises a curved section that is configured to change shape due to change in heat load from the exhaust gas emissions.

18. The exhaust gas aftertreatment device according to claim 16 wherein the resilient section of the circumferential surface comprises a curved section.

19. The exhaust gas aftertreatment device according to claim 16 wherein the resilient section comprises a membrane.

20. The exhaust gas aftertreatment device according to claim 16 wherein the resilient section comprises a corrugated section.

* * * * *